United States Patent [19]

Stevens

[11] Patent Number: 5,107,127
[45] Date of Patent: Apr. 21, 1992

[54] METHOD AND APPARATUS FOR PRECISION LOCATION OF A PERFORATION

[75] Inventor: Carl C. Stevens, Rochester, N.Y.

[73] Assignee: Eastman Kodak Company, Rochester, N.Y.

[21] Appl. No.: 565,778

[22] Filed: Aug. 13, 1990

[51] Int. Cl.$^5$ .................. G01N 21/86; G03B 23/12
[52] U.S. Cl. .................. 250/548; 353/26 A; 356/400
[58] Field of Search .......... 250/548, 557, 560, 561, 250/223 R; 353/26 A, 26 R; 356/400, 401

[56] References Cited

U.S. PATENT DOCUMENTS

| | | | |
|---|---|---|---|
| 3,778,630 | 12/1973 | White et al. | 353/26 A |
| 4,068,934 | 1/1978 | Tanaka et al. | 353/26 A |
| 4,081,671 | 3/1978 | Bohme et al. | 250/202 |
| 4,104,680 | 8/1978 | Holland | 358/214 |
| 4,110,627 | 8/1978 | Isherwood | 250/561 |
| 4,142,105 | 2/1979 | Erdmann | 250/548 |
| 4,146,797 | 3/1979 | Nakagawa | 250/548 |
| 4,174,891 | 11/1979 | Flint et al. | 353/26 A |
| 4,245,253 | 1/1981 | Fearnside | 358/214 |
| 4,296,438 | 10/1981 | Stemme et al. | 358/214 |
| 4,319,280 | 3/1982 | Roos et al. | 358/214 |
| 4,370,059 | 1/1983 | Masuda | 250/548 |
| 4,453,823 | 6/1984 | Sugita et al. | 353/26 A |
| 4,485,982 | 12/1984 | St. John et al. | 250/557 |
| 4,518,856 | 5/1985 | Blackington | 250/202 |
| 4,528,630 | 7/1985 | Sargent | 250/548 |
| 4,607,950 | 8/1986 | Ishii et al. | 355/41 |
| 4,665,318 | 5/1987 | Toda et al. | 353/26 A |
| 4,683,380 | 7/1987 | Shipkowski et al. | 250/548 |
| 4,691,112 | 9/1987 | Wydler | 250/570 |
| 4,809,188 | 2/1989 | Willits et al. | 250/548 |
| 4,823,204 | 4/1989 | Holland | 358/347 |
| 4,857,745 | 8/1989 | Gough | 250/548 |
| 4,864,149 | 9/1989 | Matsumoto | 250/561 |
| 4,875,102 | 10/1989 | Poetsch | 358/214 |
| 4,891,528 | 1/1990 | Kuecker et al. | 250/548 |

Primary Examiner—David C. Nelms
Assistant Examiner—Michael Messinger
Attorney, Agent, or Firm—Edward Dugas

[57] ABSTRACT

The present invention is a system that includes a quadrant detector with an axis between the detector elements aligned with the direction of film motion. The output of the detector is used by an analog signal processor composed of adders and subtractors to produce signals for detecting the center of the perforation and lateral displacement of the perforation and to provide an illumination adjustment signal. Control logic connected to the analog processor produces signals indicating perforation edge crossings. The center crossing signal is used to control sampling of an illumination adjustment signal and a lateral displacement signal while the edge crossing signals are used for a timing reference for the bottom edge of the film frame. The control logic also detects these trigger signals, controls the capture of the illumination and displacement signals and provides an interrupt to a computer to indicate the capture operation is complete. The computer then retrieves the captured values and uses the values to adjust the position of the image from the film captured by a video detector.

17 Claims, 5 Drawing Sheets

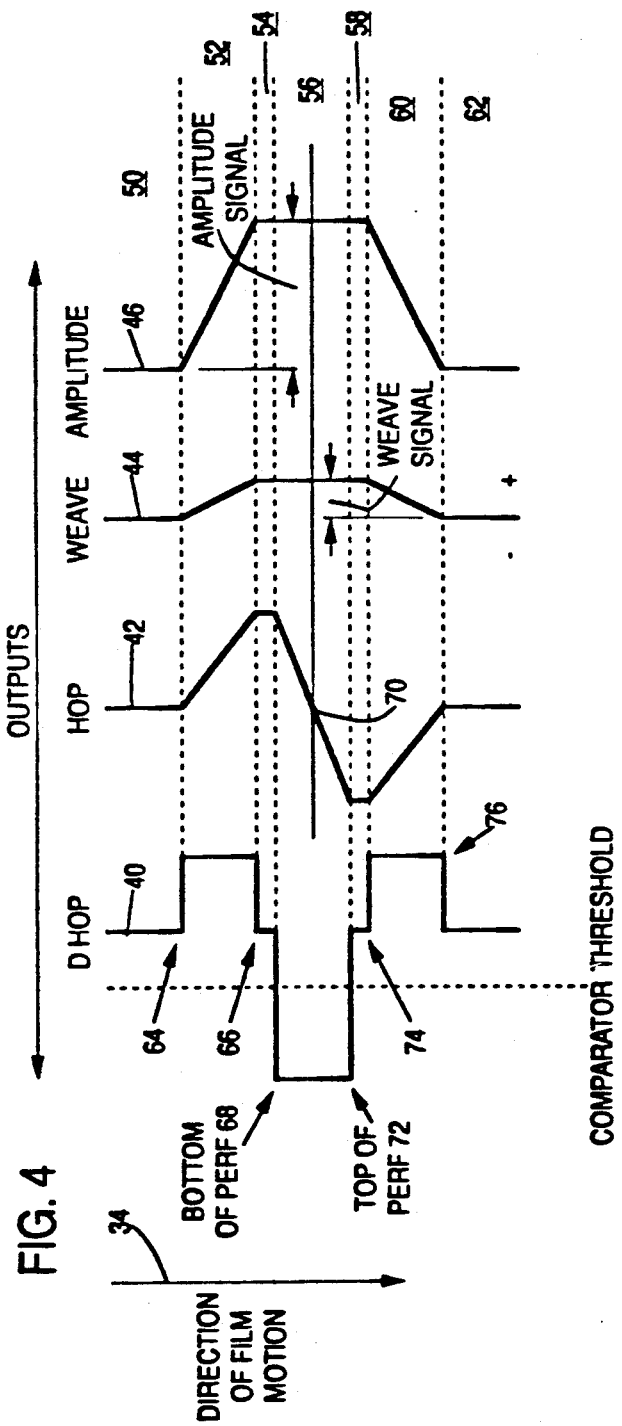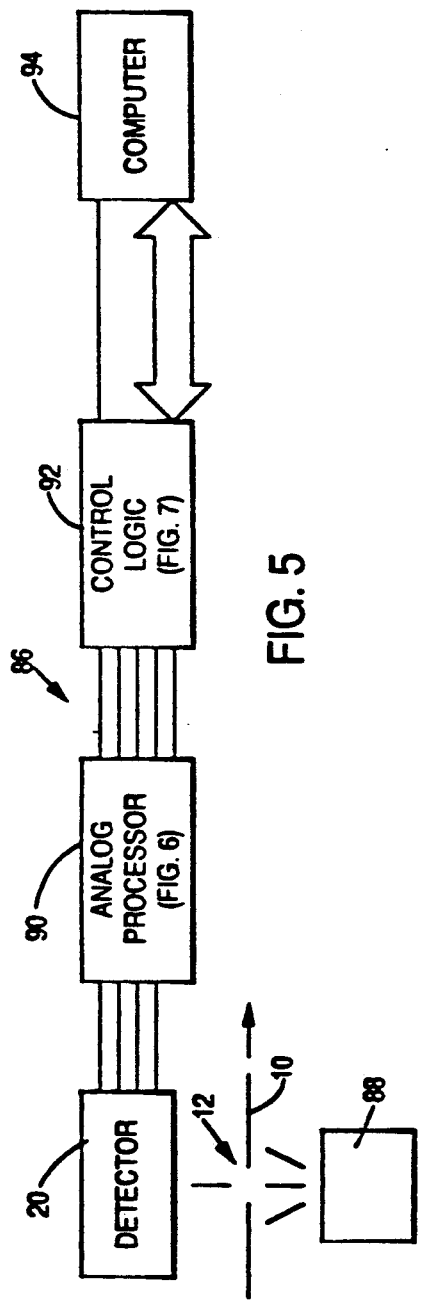

METHOD AND APPARATUS FOR PRECISION LOCATION OF A PERFORATION

BACKGROUND OF THE INVENTION

1. Field of the Invention

The present invention is directed to a method and apparatus for determining the location of perforations and, more particularly, to measuring the location of film during film to video conversion in a continuous motion telecine, so that mechanical or electronic means can be used to correct for undesirable motion.

2. Description of the Related Art

A number of techniques to reduce image unsteadiness in video converted motion picture film have been attempted. U.S. Pat. Nos. 4,823,204, 4,104,680 and 4,296,438 cover a variety of aspects of film motion detection using a flying spot scanner. U.S. Pat. Nos. 4,296,438 and 4,875,102 use charge coupled device sensors to accomplish the same result. Other techniques, typified by U.S. Pat. Nos. 4,864,149 and 4,319,280 use the film frame and light sensors to detect the characteristics of the passing film. Still other techniques as typified by U.S. Pat. Nos. 4,207,473 and 4,578,483 detect the film edge or marks along the edge of the film. In addition, techniques for detecting marks on and edges of webs exist such as described in U.S. Pat. Nos. 4,857,745 and 4,146,797. These patents share, in common, a scanning input of some type to perform the detection of motion. Of these techniques some are very complex and would be unsuitable for real time operation and others are not capable of detecting the center of a perforation, the edges of a perforation and the lateral displacement of the perforation while adjusting the illumination level of a detector light source to produce consistent signals suitable for perforation detection during film to video conversion.

SUMMARY OF THE INVENTION

It is an object of the present invention to detect the location of film perforations.

It is also an object of the present invention to provide signals concerning the relative location of film to allow a conventional system to reduce image unsteadiness in video converted motion picture film.

It is a further object of the present invention to detect the leading and trailing edges of film perforations.

It is an object of the present invention to provide a system that monitors the amplitude of a detector light source during the film to video conversion process so that the illumination of the perforation can be kept constant.

It is also an object to provide a system which will monitor the light source for the film frame and perforation when the source is the same for both.

It is another object of the present invention to detect lateral movement of the film.

It is also an object of the present invention to detect the center of a film perforation.

It is still a further object of the present invention to normalize perforation detection signal for changes in the size of perforations due to, for example, tears, dirt or manufacturing variations in the perforations in the film.

It is an object of the present invention to provide a simple system capable of providing film unsteadiness data in real time.

The above objects can be accomplished by a system that includes a quadrant detector with a motion axis between the sensing elements aligned with the direction of film motion and a traverse axis between the elements oriented transversely to the motion axis. The detector is used to produce signals for detecting perforation edges, the center of the perforation, lateral displacement of the perforation and to provide an illumination adjustment signal. A center crossing signal is used to control sampling of the illumination adjustment signal and the lateral displacement signal while the center crossing signal and the edge crossing signals are used for timing and motion position determination. Logic circuits are used to detect and capture the signals and provide an interrupt to a computer to indicate the capture operation is complete. The computer then retrieves the captured values and uses the values to adjust the position of the image from the film captured by a video detector.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a graph of the signals produced by the present invention used for steadiness correction;

FIG. 5 is a block diagram of the components of the present invention;

DESCRIPTION OF THE PREFERRED EMBODIMENTS

Figure 1:
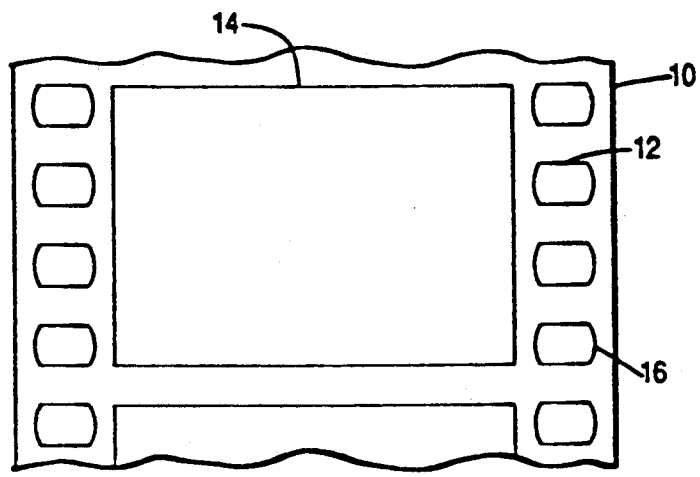
FIG. 1 illustrates a piece of film.

Motion picture film is a strip of film 10 with perforations 12 placed close to each edge of the film as illustrated in FIG. 1. These perforations or markers are used in the motion picture camera to move the film and to align the film to a set of pins in the camera for each exposure. Thus, the perforations 12 are a reference to which the image is placed on the film by the camera. It is general practice to maintain consistency between image frame registration and a perforation, such as perforation 16. Thus, by locating the perforation 16 it is possible to locate the image frame 14.

Figure 2:
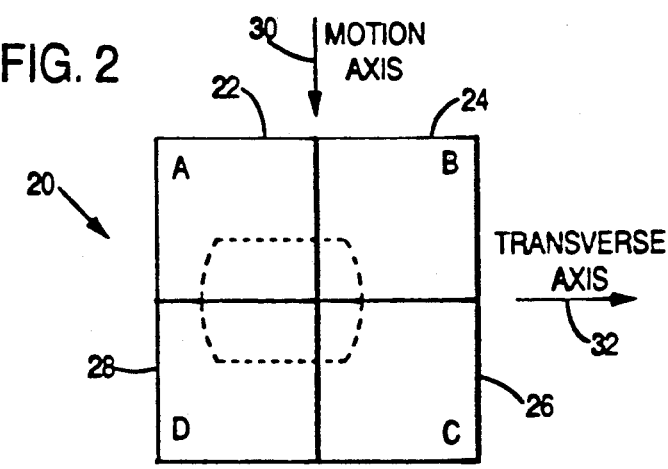
FIG. 2 illustrates a quadrant detector in accordance with the present invention.
Figure 3:
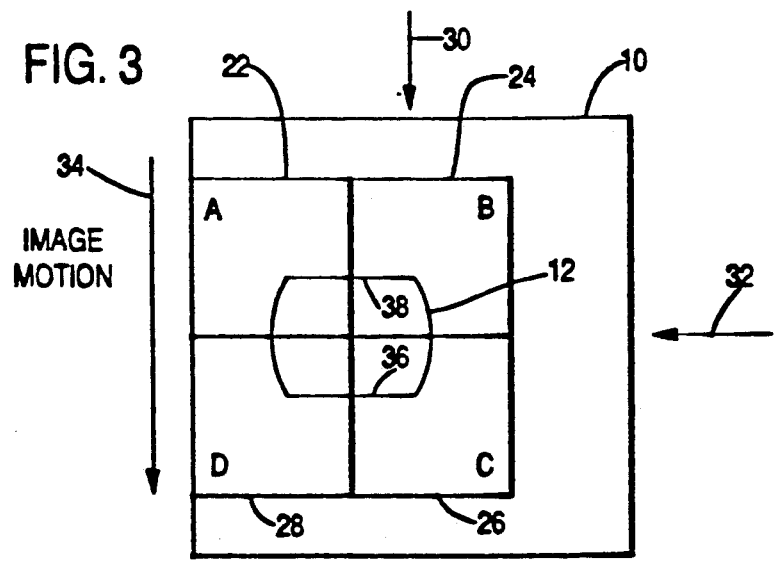
FIG. 3 depicts the quadrant detector of the present invention in relation to film perforations.

The present invention uses a quadrant detector 20 as illustrated in FIG. 2 to detect the location of the perforations 12. The quadrant detector 20 is a conventional light sensitive device containing four regions of light sensitivity or light sensing elements 22-28. The quadrant detector 20 is arranged orthogonally with elements 22-28 on both sides of a motion axis 30 and a transverse axis 32. The motion axis 30 is aligned with the direction of film motion 34 and the transverse axis 32 is perpendicular to the motion axis 30. The elements 22-28 should be positioned as closely as possible to their neighbors across the dividing axis so that the gap at the axis is as small as possible. The elements 22-28 can be round or some other shape, however rectangular or square shaped elements are typical. Each region or light sensitive element 22-28 of the quadrant detector 20 preferably is designed with uniform sensitivity preferably within two percent. The detector 20 is located in the film to video converting. The detector 20 includes therewith conventional optics so that as the film is scanned an image of the perforation, produced by shining light on the side of the film opposite to the detector, moves across the quadrant detector 20. Of course, a sharp shadow or a clear shadow of the perforation 12 could be used for detection. This would eliminate the need for the optical lenses sued to focus the light from the perforation onto the detector 20. Color filters can be used to enhance the contrast between the film 10 and the perforations 12. The film and the quadrant detector 20 are placed so that the image of the perforation 12 starts passing across the detector in regions A and B moving in the direction of regions C and D as shown in FIG. 3, so that the signals produced by elements 22 and 24, as the perforation moves across the quadrant detector 20, come before the signals produced by elements 26 and 28. As the film moves the center, leading 36 and trailing 38 edges of the perforation cross the transverse axis 32, and if the perforation is off centered with respect to the motion axis more light falls on one side of the motion axis than on the other.

The elements 22-26 are used to generate four signals in either analog or digital form as set forth in the equations below:

$$\text{Hop} = \frac{(A - C) + (B - D)}{A + B + C + D} \quad (1)$$

$$\text{Weave} = \frac{(A - C) - (B - D)}{A + B + C + D} \quad (2)$$

$$\text{Amplitude} = A + B + C + D \quad (3)$$

$$d\text{Hop} = \text{derivative of Hop}, \quad (4)$$

where the letters in equations 1-4 are the outputs of the corresponding elements illustrated in FIGS. 2 and 3. The Hop and dHop signals provide perforation location information along the length of the film 10. The Weave signal is proportional to the amount of light falling on one of the sides of the motion axis and has a sign that indicates to which side of the motion axis the signal corresponds. In this way the Weave signal provides location information across the film or transverse to the motion of the film. The Amplitude is the total light falling on the sensor and can be used to maintain the illumination of the film at a constant value, so that the perforations can be detected with a constant illumination. The derivative of the hop signal in equation 4 indicates edge crossings and can be used for location or timing.

As the film moves the values of the Hop 42, Weave 44, Amplitude 46 and dHop 40 signals are illustrated in FIG. 4. This figure assumes that the perforation 12 is displaced slightly, to the left on the detector 20 rather than centered as illustrated in FIG. 3. This positioning to the left is illustrated by the dashed line in FIG. 2. The signals in FIG. 4 are divided into regions 50-62. In the first region 50, the perforation has not been detected by the detector 20 and thus constant low level signals are produced by the elements. In the second region 52 the edge of the perforation has crossed over the edge of elements 22 and 24 and therefore light is falling on these elements. As the perforation continues to move over the elements 22 and 24, the strength of the Hop and Amplitude signals increases and, if the perforation is transversely off centered, the Weave signal also increases in magnitude with the sign indicating the side of the motion axis 30 on which the perforation image is primarily falling. The interface between regions 50 and 52, as indicated by the edge 64 on the dHop signal 40, indicates the crossing of the bottom or leading edge 36 of the perforation onto the detector 20. The region 54 is a region during which the perforation image has moved completely onto elements 22 and 24 and thus the edge 66 indicates the crossing of the trailing edge 38 of the perforation 12 onto the elements 22 and 24. The region 56 is the region where the perforation is passing over all four elements 22-28. As a result the edge 68 defines the crossing of the bottom of the perforation or leading edge of the perforation image onto elements 26 and 28. Since the relationship between the perforation edge and the film frame is consistent, it is possible to reference the image from the perforation at this time. The zero crossing 70 of the hop signal 42 defines when the perforation image is half on elements 22 and 24 and half on elements 26 and 28. As previously mentioned, at this time the Amplitude term in the equation is neglected since only the zero crossing is used for detection purposes the amplitude term is neglected. This is the indication that the perforation is centered in the direction of motion on the quadrant detector 20 and is the point at which the amplitude signal 46, the Weave signal 44 and Right and Left side signals are preferably sampled for their values. The region 58 is the region during which the perforation 12 is completely on the elements 26 and 28 and the edge 72 indicates that the top of the perforation or the trailing edge 38 has crossed between the pair of elements 22 and 24 and the pair of elements 26 and 28. The region 60 is a region during which the perforation is partially on detectors 26 and 28 and partially off the detector 20 in the direction of image motion. As a result, the edge 74 defines the crossing of the bottom of the perforation or leading edge 36 off of the detector 20. The region 62 is where the perforation image has completely passed off the detector 20 and the edge 76 indicates the crossing of the top of the perforation or trailing edge 38 over the edges of the detectors 20. As can be seen from the above discussion, from the values of the dHop, Hop and Weave signals, it is possible to easily evaluate the location of the perforation 12. In some circumstances the edges 64, 66 and 72-76 can be better timing references for the film frame 14. The time value of the zero crossing 70, in addition to being a sampling time indicator, can also be used to determine when the top of the frame should be encountered and the time between zero crossings can be used to determine film speed. As a result, zero crossings can be used to autocalibrate systems with variable speed film drives. The magnitude of the Weave signal at its plateau is the weave value. This gives an indication of the side to side or transverse motion of the film. The Amplitude signal is used to control illumination, so that the magnitude of the Weave signal does not vary based on changes in illumination. This signal can also be used to monitor the light source passing through the frame 14, if the perforation source and the image source are the same. If the Amplitude signal is the magnitude of the source of the light for both the perforation 12 and the frame 14, this signal should not be used for adjusting the light source to maintain the Weave signal amplitude term constant, since this would create noise in the frame conversion process. As illustrated in FIG. 4 the positive weave signal 44 indicates that the perforation is translated to the left as illustrated by the dashed line in FIG. 2.

To produce the various values for the time of the various edge crossings and the value of the Weave signal, a system 86 as illustrated in FIG. 5 is used with the quadrant detector 20. A light source 88 shines through the perforation 12 in the film 10 and the image of the perforation 12 or the shadow of the perforation is sensed by the detector 20. An analog processor 90 converts the outputs of the detector 20 into the Hop, dHop, Weave and Amplitude signals using the equations 1–4 previously mentioned. The control logic 92 based on these signals stores the time of occurrence and/or magnitude of the signals as needed and provides an interrupt to a computer 94. The computer 94 is preferably an MPL4080 single board computer from Gespac, Inc. which is based on the conventional Motorola 68000 processor. The computer 94 upon receiving the interrupt then retrieves the values saved from the control logic 92 and performs conventional image steadiness correction.

Figure 6:
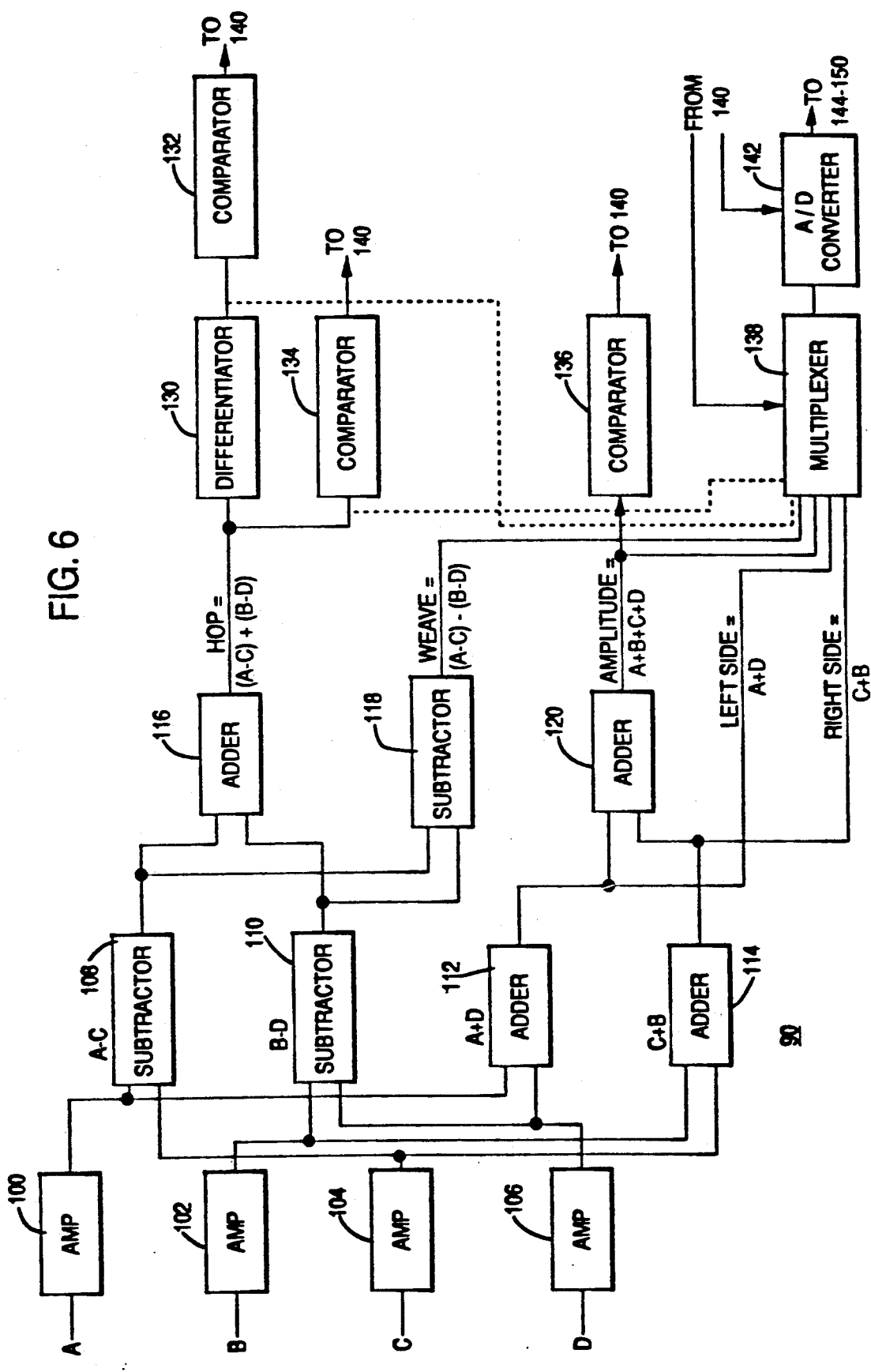
FIG. 6 is a circuit diagram of the components of the analog processor of FIG. 5.

The analog processor 90, as illustrated in FIG. 6, includes conventional matched signal amplifiers 100-106 which amplify the signals from the detectors 22-26 and supply them to a group of conventional subtractors and adders. The first subtractor 108 subtracts the C signal from amplifier 104 from the A signal from amplifier 100. The second subtractor 110 subtracts the D signal from amplifier 106 from the B signal from amplifier 102. The first adder adds the A signal and D signal while the second adder adds the B signal from amplifier 102 and the C signal from amplifier 104. The signals from subtractors 108 and 110 are added together by adder 116 to produce the Hop signal. The outputs of these subtractors 108 and 110 are subtracted by subtractor 118 to produce the Weave signal. The Amplitude signal is produced by adder 119 adding the outputs of adders 112 and 114. The outputs of adders 112 and 114 are also provided separately as the Left and Right side signals. As can be seen in FIG. 6, the Hop and Weave signals produced within the analog processor 9 are different from equations 1 and 2 in that the Amplitude term is not used to produce the signals. The present invention preferably does not use the Amplitude term in the Weave and Hop signals thereby simplifying the circuit. Ignoring the Amplitude term is possible because the process of correcting for unsteadiness in the converted frames is a relative process. For the Hop and dHop terms only the zero and threshold crossings for edges are relevant and thus the scaling caused by the Amplitude term is irrelevant. For the Weave signal, as long as the fedback Amplitude term is used to adjust the light source for perforation detection the Amplitude term in the denominator of equations 2 remains stable and the relative value of the Weave signal remains proportional. The use of the Weave signal for illumination control allows the used portion of the sensitivity range of the amplifiers, etc. to be less, thereby providing tighter control which reduces component created error. Thus, when the light source for the detector is controlled by the Amplitude signal the Weave signal does not need to be corrected for changes in illumination. If the light source for the perforations 12 and frame 14 is the same, the Weave signal produced by subtractor 118 should be corrected in the computer 94 by dividing the Weave value with the Amplitude value as set forth in equation 2. This adjustment of the weave value with the Amplitude term within the computer removes the variability in the Weave signal caused by variations in perforation size due to tears, dirt or manufacturing errors.

The analog processor 90 through a conventional differentiator 130 produces the dHop signal which is applied to a conventional comparator 132. The comparator 132 is designed to detect the edges 68 and 72 of the dHop signal which indicate the passing of the leading and trailing edges of the perforation 12 over the traverse axis 32. As a result, the comparator 132 need only include a fixed threshold that is capable of detecting the threshold crossings associated with the leading and trailing edges of the perforations. This threshold value is speed dependent and should be between zero and the slope of the Hop signal. Of course, it is possible to have the threshold value used by the comparator 132 loaded by the computer 94 allowing programmable edge selection detection. This would be particularly appropriate where the invention is being used in a variable speed drive system. The control logic 92 also includes a conventional comparator 134 which is designed as a zero crossing comparator to detect the zero crossing 70 of the Hop signal. As previously discussed, the time at which the Hop signal crosses zero is the time at which the Weave, Amplitude, Right and Left side signals are sampled.

The processor 90 also includes a conventional comparator 136 which is designed to produce an enable signal when the Amplitude signal exceeds a threshold. This enable signal is used to enable a measurement cycle and prevents false triggering of a measurement cycle by, for example, the Hop signal when noise causes variations in the Hop signal around zero when the detector is between perforations. If the Amplitude value is too low then the measurement cycle is not enabled and the noise is ignored. The threshold of comparator 135 should be set at approximately 50% of the expected maximum Amplitude value.

Figure 7:
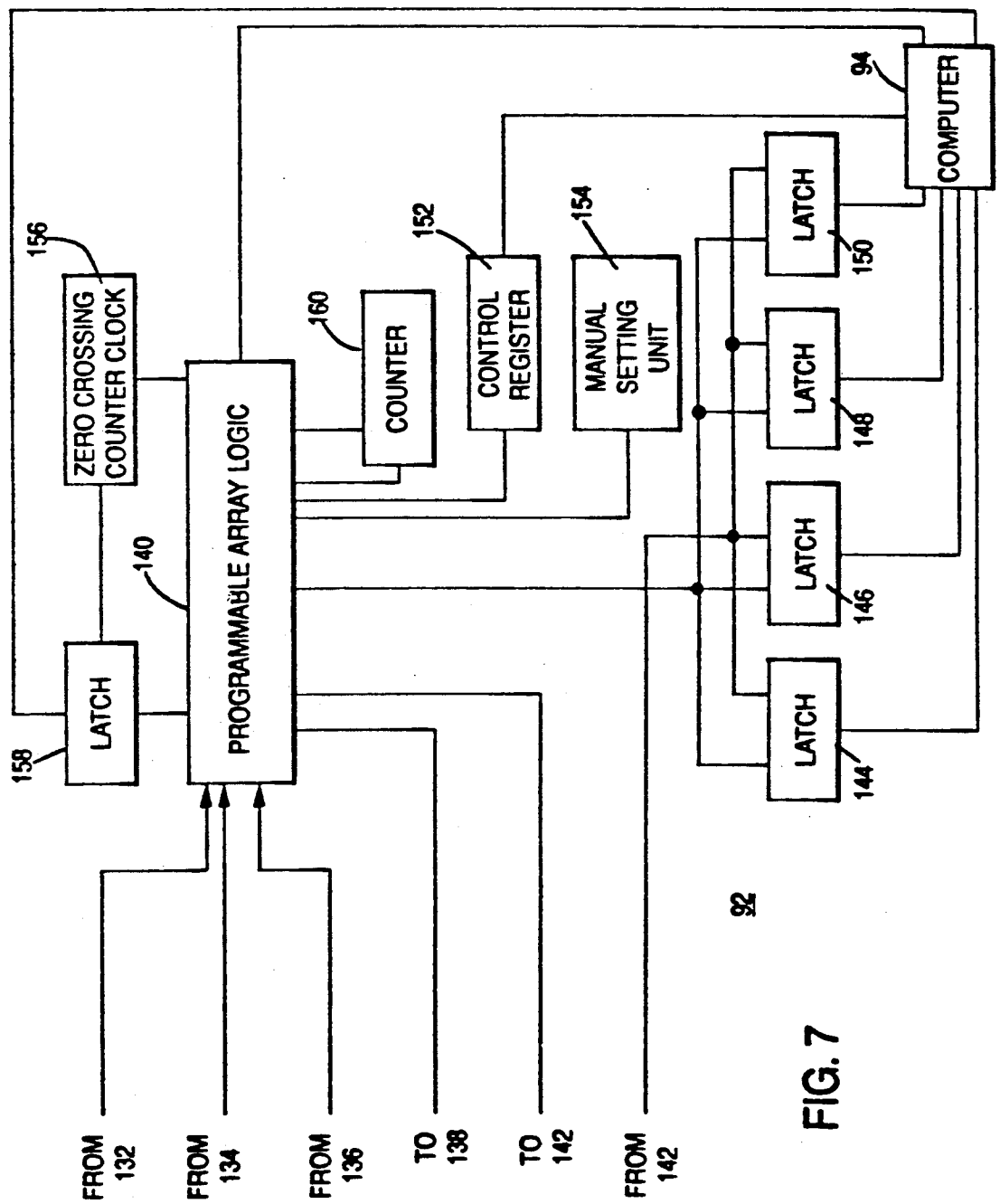
FIG. 7 illustrates the components of the control logic of FIG. 5.

The Weave, Amplitude, Right and Left side signals are supplied to a conventional 4:1 multiplexer 138 (FIG. 6) which is controlled by programmable array logic 140 (FIG. 7). The logic 140 selects from among the Weave, Amplitude, Right and Left signals and controls the multiplexer 138 that provides the analog value to a conventional analog to digital converter 142. The converter 142 under the control of the array logic 140 digitizes the applied analog signal and supplies this signal to latches 144-150 illustrated in FIG. 7, preferably as a 10 bit value. The programmable array logic 140 enables the conventional latches 144-150 to store the output of the converter 142. The system is designed to store any combination of the Weave, Amplitude, Left and Right signals. For example, each latch could store a sample of the weave signal that occurs at slightly different times which could then be averaged for noise reduction, so that all four latches include weave signal samples, or the latches could store two weave and two amplitude samples or the latches could store one weave sample, one amplitude sample, one left sample and one right sample or other combinations.

A control register 152 determines what type of trigger is used as the reference for taking the samples and storing them in latches 144-150. As previously discussed the system is capable of triggering on the Hop signal zero crossing 70 and the threshold crossings of the dHop signal associated with the comparator 132 to detect the leading 68 and trailing 72 edges of the perforation. In the implementation discussed herein the triggering is only on these events. If a programmable comparator is provided rather than the fixed comparator 132 the other edges 64, 66, 74 and 76 could also be selectably used as triggers as desired allowing for selection of timing signals during the conversion process as conditions change.

A manual setting unit 154, which can be jumpers, switches or a computer loaded latch, determines what signals are captured, in which order and when to provide an interrupt signal to the computer to indicate that the sampling cycle is complete and the data is available.

The system also includes a 32 bit zero crossing counter clock 156 using an 8 MHz clock and which continuously counts up. 32 bits is sufficient to uniquely identify events during an 8.9 minute rollover period and the computer 94 is required to correlate the samples to the periods. When a trigger signal occurs, the programmable array logic 140 loads the count of the zero crossing counter clock 156 into latch 158 preferably as a 32 bit value which is thereby made available to the computer 94.

The system also includes a counter 160 which operates with the programmable array logic 140 to produce a sequencer which controls the multiplexer 138, converter 142, latches 144-150 and latch 158 in accordance with the settings for the type of trigger, the signals to be sampled and the order of sampling stored in the control register 152 and the manual setting unit 154. When the signal sample sequence selected by the control register 152 and manual setting unit 154 is complete, the programmable array logic 140 provides an interrupt to the computer 94. The programmable array logic 140 has input jumpers used to select one of the four sampling cycles for producing the interrupt signal to the computer 94. It is of course possible to provide an interrupt control register loadable by the computer 94 which can be used to select the desired state for indicating the interrupt. This can be accomplished by providing an AND gate for each possible interrupt signal which is connected to a bit in the interrupt control register with outputs of the AND gates fed to an OR gate and with the output of the OR gate providing the interrupt signal to the computer 94. The bit in the interrupt control register which indicates that a particular interrupt signal should be selected, when applied to appropriate AND gate, will allow the selected interrupt signal to pass through the AND gate and through the OR gate to the computer 94.

As previously mentioned the zero crossing counter clock 156 provides a system reference for all time measurements. The ripple carry-out output of this clock 156 can be provided to other systems 86, so that all the sampling systems in a multiple sampling system set up can be synchronized. The ripple carry out of the master system would be provided to the reset input of the clocks 156 of the slave systems.

The programmable array logic preferably is two programmable array logic devices model PAL 16R8 from Advanced Micro Devices of Sunnyvale, Calif. The first of these, designated the control logic PAL, when enabled, detects a zero crossing condition using inputs from the comparators 132 and 134 and, based on the selection stored in the control register, determines which type of zero crossing will be used as the trigger to begin a sequence of sampling operations. When this PAL detects a valid trigger condition, the value of the counter 156 is latched into latch or register 158 to provide a time for the zero crossing. Conversion control is performed with the counter 160 controlled by the control logic PAL and a sequencer PAL used to decode the counter 160 output. Once triggered, the control logic PAL releases the counter 160 from a reset condition and the sequencer PAL generates the signals to select the A/D input, request a conversion and latch the resultant output to the correct latch location responsive to the count in counter 160. This selection, request and latch cycle is performed four times. The sequencer counter 160 runs until a feedback line tells the control logic PAL that the sequence is complete and to reset the counter. Each conversion cycle uses 32 microseconds for a total of 128 microseconds for the completion of the four cycles of conversions. The preferred computer is fast enough to set the register 152 to trigger on the perforation bottom, reset the register 152 to trigger on the perforation center and the reset register 152 to trigger on the top of the same perforation. Each cycle includes multiplexer selection, A-D conversion and latching. The four registers or latches 144-150 and the register or latch 158 are preferably memory mapped into computer 94 and are available over a conventional bus. If the preferred PAL devices are used the devices should be programmed in accordance with the Appendix. If other devices are used a person of ordinary skill in the art can produce the appropriate programming code.

A typical sequence of operation for the system of the present invention is for the computer 94 to load the control register with the type of trigger signal to be used. The programmable array logic 140 waits for an enable signal from comparator 136 and enters a wait for trigger state. The logic waits for the trigger to occur, identifies the trigger and when the trigger occurs, stores the count in zero crossing counter clock 156 into latch 158 and starts counter 160 counting. At this point the programmable array logic 140 selects the appropriate input line of the multiplexer 138 based on the output of the manual setting unit. Next, the array logic 140 initiates an A/D conversion and latches the output into one of the latches 144-150 as specified by the manual setting unit 154. At this time, an interrupt can be generated to the computer 94 if the manual setting unit indicates that this is the sample to be provided to the computer. Even if the interrupt is generated the cycle of mux selection, A/D conversion and storage occurs three more times. At the end of any conversion an interrupt could have been generated if that cycle was selected as the interrupt cycle. At the end of the four cycles, the array logic 140 returns to wait for the enable signal discussed above. The computer 94 once it receives the interrupt can at any time retrieve the contents from the latches 144-150 or ignore the interrupt all together.

Figure 8A:
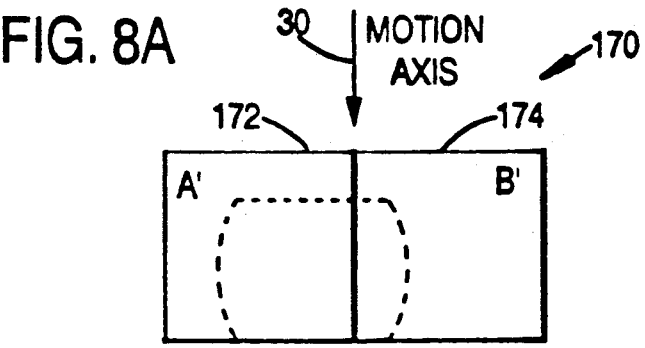
FIGS. 8A and 8B illustrate bicell detectors.
Figure 8B:
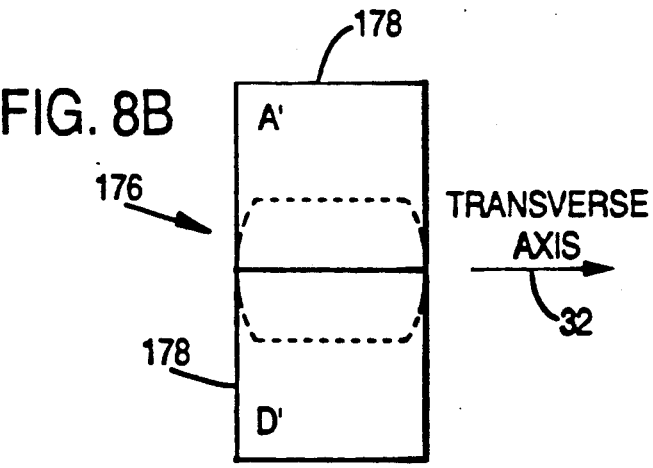

The present invention, rather than having a quadrant detector 20 sampling a single perforation, can have two bicell detectors 170 and 176 such as illustrated in FIGS. 8A and 8B sampling two different perforations in different locations, such as perforations 12 and 16 in FIG. 1. The first of these bicell detectors 170 includes two light sensing elements 172 and 174 producing a Weave signal in accordance with:

$$\text{Weave} = \frac{A' - B'}{A' + B'} \qquad (5)$$

The second of the bicell detectors 176 also includes two light sensing elements 178 and 180 producing a Hop signal in accordance with:

$$\text{Hop} = \frac{A' - B'}{A' + B'} \quad (6)$$

where the A' signal for the Weave signal is from element 172 which is different from the element 178 that produces the A' signal for the Hop signal.

The above description has assumed that the Weave and Amplitude signals are the important signals for determining perforation location. This is the case when autonomous detection is desired. In some circumstances it may be desirable to allow the computer to ask where the perforation is located at a particular time. Since the magnitude of the Hop and dHop signals at times other than the zero crossing 70 or the edges 64, 66, 68, 72, 74 and 76 can be used to determine the location of the perforation, it is possible to sample the values of these signals upon demand by the processor 94. To facilitate this enhanced embodiment the circuit of FIG. 6 would include signal lines from the differentiator 130 and adder 116 to the multiplexer 138 as shown by the dashed lines. The multiplexer would then become a conventional 8 to 1 multiplexer and two additional latches connected on the output side of the converter and to the processor 94 would be appropriate. Further, a cycle start input line into the logic 140 over which the computer 94 could start the sampling at a desired time would also be necessary and the bus connections to the new latches would have to be added for sample access by the computer 194. The programmable array logic would of course have to be reprogrammed to select the Hop and dHop signals, store the samples in appropriate latches and generate the appropriate interrupt. However, one of ordinary skill in the art could make those changes to the appendix for the preferred PAL devices.

The above description described the detector 20 receiving light passing through the perforation 20. It is also possible to use the reflectance image of a light shown on the film from the same side as the detector 20.

The above description also described detector signal processing as analog. The use of analog signals allows very precise time detection of perforation crossings. It is possible to do this digitally but this would require at least 10 bits of precision and a very rapid A/D converter.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX

Quadrant Perforation Detection System
this is the code to run the interrupt timing for the
Control Logic board. The inputs: inv1, inv2, and
both, are set by jumper and are constant during the
running of the chip.

Control Logic Device PAL16R8;

```
-******input declarations****** clk        pin 1;
dHOPzc     pin 2;
HOPzc      pin 3;
zcGATE     pin 4;
CR1        pin 5; control register location 1
CR0        pin 6; control register location 0
```

```
CR1   CR0
 0     0    HOP RISING
 0     1    HOP FALLING
 1     0    dHOP RISING
 1     1    dHOP FALLING

INTrst  pin 7; interrupt reset signal, this
               terminates the request for interrupt
               and is generated by the computer when
               it reads the data in the latches.

INTtrig pin 8; interrupt trigger signal jumper
               selected
EoSEQ   pin 9; end of conversion sequence signal (4
               cycles)
Ground  pin 10;

********output declarations********
+5v     pin 2;
dHOP_del pin 19; a delayed dHop signal, delay is
                 one clock
HOP_del  pin 18; a delayed Hop signal, delay is one
                 clock
SEQcomb  pin 17; combined output from the two
                 SEQcntr signals, The SEQcntr had
                 to be split to fit into the
                 device. The two halves are
                 combined into this one signal for
                 use.
zcLatch  pin 15; zero crossing counter clock value
                 latch signal
SEQcntr  pin 14; sequence control signal part1
SEQcntr2 pin 13; sequence control signal part2
INTreq   pin 12; interrupt request to the computer

********equates********

H,L,X,Z,C    =     1,0,.X.,.Z.,.C.;

equations
********
Generate delayed HOP signals. these signal are used
to determine if the value has changed, so that a
rising and falling edge can be defined. The rising
and falling edges determine the trigger. The edge
is found by anding the former state of the signal
with the present state of the signal. When this is
"anded" with the control register values CR1 and CR0
various trigger conditions can be enabled.
********
dHOP_del  :=  dHOPzc;
HOP_del   :=  HOPzc;

********
Generate a signal to start the counter clock value
and to latch system time The first two equations in
parenthesis are terms that trigger on the
appropriate edge, when the zero crossing gate is
enabled and no interrupt is occuring, and the end of
sequence is not involked. The third term allows the
end of sequence, an interrupt reset or the resetting
of the SEQcntr to reset the signal. These are the
terminating conditions for the signal. The second
equation follows the first in form and covers two
other trigger conditions.
********

SEQcntr: = (!CR1 & !CR0 & !HOP_del & !HOPzc &
!zcGATE & INTrst & !EoSEQ )
         #(!CR1 & CR0 & HOP_del & !HOPzc & !zcGATE
           & INTrst & !EoSEQ )

SEQcntr 2:= (!CR1 & !CR0 & !HOP_del & HOPzc &
!zcGATE & INTrst & !EoSEQ, )
         # (!CR1 & CR0 & HOP_del & HOPzc &
!zcGATE & INTrst & !EoSEC)
         # (SEQcntr2 & INTrst & EoSEQ);
```

This equation combines the two equations above and includes a term to cancel the sequence without the delay through the above equations.

```
SEQcomb :=(SEQcntr # SEQcntr2 ) & !EoSEQ & INTrst:
         "quick cancel on combined signal
         (In this implementation zcLatch is the
         same as SEQcomb.
zcLatch := (SEQcntr # SEQcntr2) & !EoSEQ & INTrst;
           zcLatch is same as SEQcomb
```

The above equations have defined the controls for the counter and system. The following equation takes care of the interrupts initiating and cancelling
********
Generate the interrupt request
********

```
Trigger request with INTtrig and hold until INTrst

INTreq:= (INTtrig & INTrst) # (!INTreq & INTrst);

Quadrant Perforation Detection System
This is the code to run the interrupt timing for the
Control Logic board.
         the inputs: inv1,inv2, and both, are set
by jumper and are
"constant during the running of the chip.

CONTROL LOGIC SEQUENCER Device AMD PAL16r8;

************* input declarations *********
clk           pin 1;  clock
cntr_7        pin 2;  counter output bits
cntr_6        pin 3;         ""
cntr_5        pin 4;         ""
cntr_4        pin 5;         ""
cntr_3        pin 6;         ""
cntr_2        pin 7;         ""
cntr_1        pin 8;         ""
cntr_0        pin 9;         ""
Ground        pin 10;

********output declarations ************
+5v           pin20;
dLatch_4      pin 19;  data latch 4 trigger
dLatch_3      pin 18;  data latch 3 trigger
dLatch_2      pin 17;  data latch 2 trigger
dLatch_1      pin 16;  data latch 1 trigger
AD_convert    pin 15;  analog to digital conversion
                       request
muxSEL_0      pin 14;  multiplexer select bit 0
muxSEL_1      pin 13;  multiplexer select bit 1

****************equates****************
H,L,X,Z,C     =          1,0,.X.,.Z.,.C.;

equations

*********
Generate a signal to start the counter clock value
and to latch system time. The counter bits are used
in such a way that the mux is selected, an a/d
conversion request is made, the system waits an
appropriate time, and the data is latched in the
appropraite latch, the cycle repeats itself for a
total of four times, each time latching to a new
latch
********* muxSEL_0 :=cntr_5;
muxSEL_1 :=cntr_6;
AD_convert := !cntr_4 & !cntr_3 & !cntr_2;
dLatch_1 := !cntr_6 & !cntr_5 & cntr_4 & cntr_3 &
    cntr_2 & cntr_1 & cntr_0;
dLatch_2 := !cntr_6 & cntr_5 & cntr_4 & cntr_3 &
    cntr_2 & cntr_1 & cntr_0;
dLatch_3:=-cntr_6 & cntr_5 & cntr_4 & cntr_3 & cntr_2
    & cntr_1 & cntr_0;
dLatch_4 := cntr_6 & cntr_5 & cntr_4 & cntr_3 &
    cntr_2 & cntr_1 & cntr_0;
```

What is claimed is:

1. A marker detection apparatus for a marker in a moving media comprising:
   a detector for sensing the marker;
   storage means for storing a location magnitude of the marker relative to said detector as sensed by said detector; and
   trigger means for triggering storage of the location magnitude in said storage means based on marker characteristics sensed by said detector.

2. An apparatus as recited in claim 1, wherein said media comprises film, said marker comprises a perforation in the film and said detector comprises four orthogonally arranged light sensing elements with a motion axis aligned in the direction of motion and between first pairs of elements and a traverse axis aligned in a direction perpendicular to the motion axis and between second pairs of elements, with the perforation moving in the direction defined by the motion axis.

3. An apparatus as recited in claim 1, wherein said trigger means comprises:
   position means for producing a position signal from signals from said detector; and
   signal means for producing a trigger signal from said position signal.

4. An apparatus as recited in claim 3, wherein said position means produces an edge signal indicating marker edge crossings, a center motion direction signal indicating centering of the marker in a direction of motion, a transverse signal indicating position of the marker in a direction transverse to the direction of motion, an amplitude signal indicating a strength of a marker detection signal and side signal indicating a proportion of the marker moving across a corresponding side of said detector.

5. An apparatus as recited in claim 4, wherein said signal means comprises:
   selection means for selecting a type of position signal for which to generate the trigger signal; and
   generation means for generating the trigger signal.

6. An apparatus as recited in claim 5, wherein said selection means comprises:
   a control register storing an indication of the type of position signal; and
   a programmable array logic circuit for detecting the occurrence of the selected position signal.

7. An apparatus as recited in claim 3, wherein said position means produces a Hop signal, a Weave signal, a Hop derivative signal, an amplitude signal, a right side signal and a left side signal.

8. An apparatus as recited in claim 3, wherein said detector comprises first-fourth sensing elements, and said position means comprises:
   a first subtractor connected to said first and third sensing elements;
   a second subtractor connected to said second and fourth sensing elements;
   a first adder connected to said first and fourth sensing elements;
   a second adder connected to said second and third sensing elements;
   a third adder connected to said first and second subtractors;
   a third subtractor connected to said first and second subtractors;
   a fourth adder connected to said first and second adders;
   a differentiator connected to said third adder;
   a first comparator connected to aid differentiator; and
   a second comparator connected to said third adder.

9. An apparatus as recited in claim 3, wherein said signal means comprises a programmable array logic circuit and a counter connected to said circuit.

10. An apparatus as recited in claim 1, wherein said storage means comprises:
   selection means for selecting a type of location magnitude to store;
   conversion means for converting signals from said detector into the selected location magnitude;
   time indication means for storing a time of occurrence of the selected location magnitude; and
   latching means for storing the selected location magnitude.

11. An apparatus as recited in claim 10, wherein said selection means comprises:
   a manual setting unit storing an indication of the type of location magnitude to store and a storage order;
   a programmable logic circuit for producing a selection signal responsive to the type; and
   a multiplexer for selecting the location magnitude to store.

12. An apparatus as recited in claim 11 wherein said conversion means comprises an analog to digital converter.

13. An apparatus as recited in claim 10, wherein said time indication means comprises:
   a counter counting time;
   a latch storing the time; and
   a programmable logic circuit activating the latch upon the time of occurrence.

14. An apparatus as recited in claim 10, wherein said latching means comprises latches for storing plural location magnitudes.

15. An apparatus for determining motion of a perforation in film, comprising:
   a light source shining light through the film;
   a rectangular quadrant detector over which the perforation moves as the film moves and including first, second, third and fourth adjacent light sensitive elements sensing the light from said light source passing through the perforation, the first and second elements comprising a first pair, the third and fourth elements comprising a second pair, the first and fourth elements comprising a third pair and the second and third elements comprising a fourth pair, the third and fourth pairs having therebetween a motion axis aligned with the direction of perforation motion, the first and second pairs having therebetween a transverse axis perpendicular to the motion axis;
   an analog processor connected to said quadrant detector and producing Hop, dHop, Weave, Amplitude, Left and Right side analog signals from the outputs of said light sensitive elements, the hop signal crossing zero when the light passing through the perforation falls equally on each side of the transverse axis, the Weave signal having a sign dependent on whether more of the light passing through the perforation falls on one or the other side of the motion axis and having a magnitude corresponding to the proportion of the light falling on a dominant side, the Amplitude signal being proportional to a total amount of light passing through the perforation and falling on said elements;
   a differentiator connected to said analog processor and producing a differential Hop signal;
   a first comparator connected to said differentiator and producing top and bottom edge signals when top and bottom edges of the perforation cross the transverse axis;
   a second comparator connected to said analog processor and producing a zero crossing signal when the Hop signal crosses zero;
   a trigger control register storing an indication of which of the top, bottom and zero crossing signals should trigger a motion determination cycle;
   control logic connected to said first and second comparators and to said trigger control register, and producing a time latch signal, a selection signal, a conversion signal, a storage signal and an interrupt signal responsive to the indication, the top and bottom edge signals and the zero crossing signal;
   a multiplexer connected to said analog processor and said control logic, and selecting one of the Weave, Amplitude, Left, Right, Hop and dHop analog signals responsive to the selection signal;
   a clock counter counting time;
   a time latch connected to said control logic and said clock counter and storing the time responsive to the time latch signal;
   an analog to digital converter connected to said multiplexer and said control logic and converting the selected one of the Weave and Amplitude signals into a digital value response to the conversion signal;
   a storage latch connected to said analog to digital converter and said control logic and storing the digital value responsive to the storage signal; and
   a computer connected to said control logic, said time latch and said storage latch and retrieving the time and the digital value responsive to the interrupt signal.

16. An apparatus for determining characteristics of a marker moving along a motion axis of a moving media, comprising:
   sensing means for sensing a center, a top edge and a bottom edge of the marker;
   time storage means for storing a time at which one of the center, top edge and bottom edge are sensed; and
   motion storage means for storing an amount of motion of the marker transverse to the motion axis when the time is stored.

17. A method of determining characteristics of a marker moving along a motion axis of a moving media, comprising the steps of:
   (a) sensing a center and top and bottom edges of the marker;
   (b) storing a time at which the one of the center top edge and bottom edge are sensed; and
   (c) storing one of an amount of motion of the marker transverse to the motion axis and an amplitude of proportional to a size of the marker.

* * * * *